Sept. 6, 1955  E. W. W. KEENE  2,717,083
FILTRATION APPARATUS
Filed Feb. 4, 1952  5 Sheets-Sheet 1
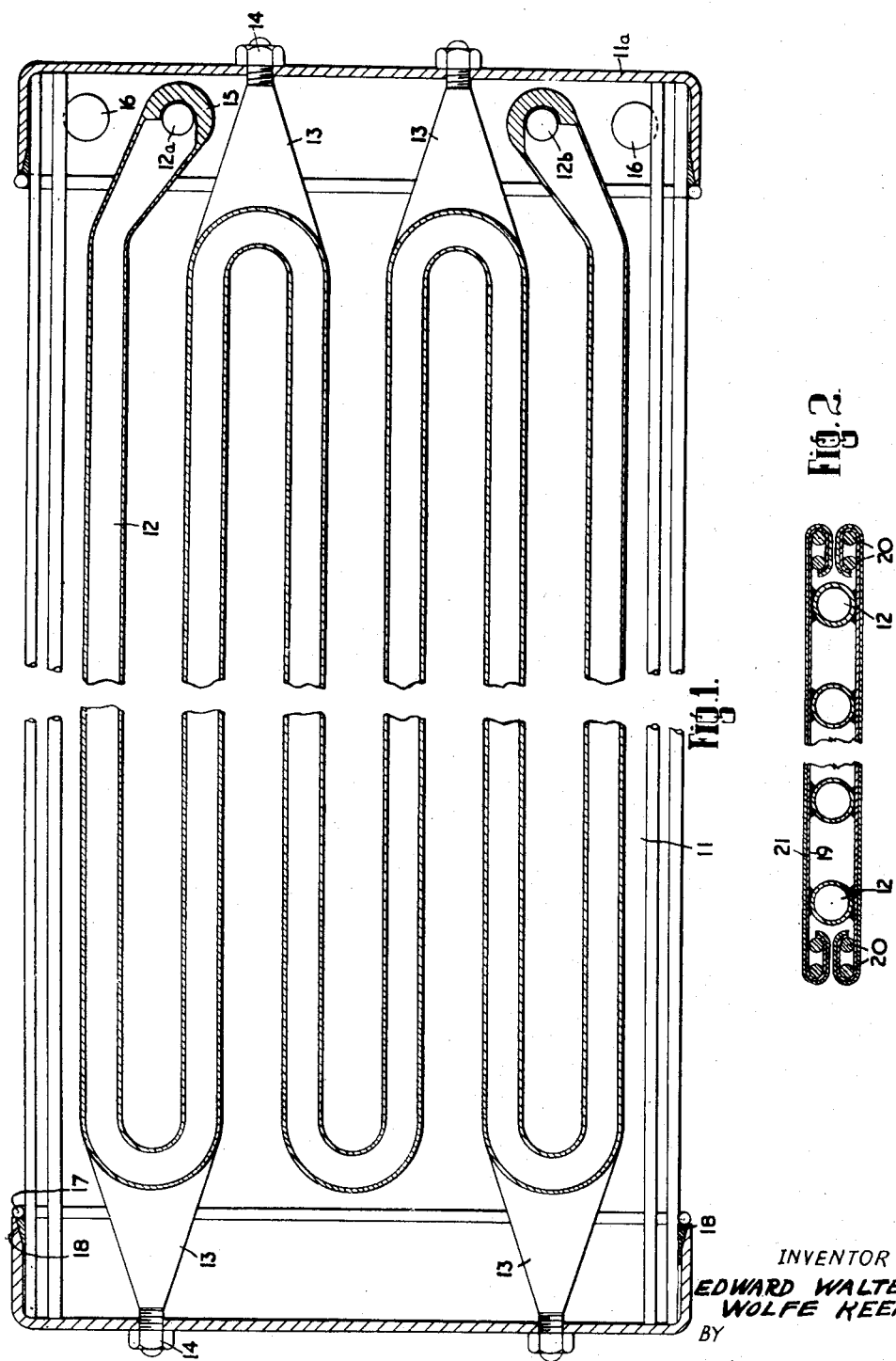
INVENTOR
EDWARD WALTER
  WOLFE KEENE
BY
John James Victor Armstrong
ATTORNEY

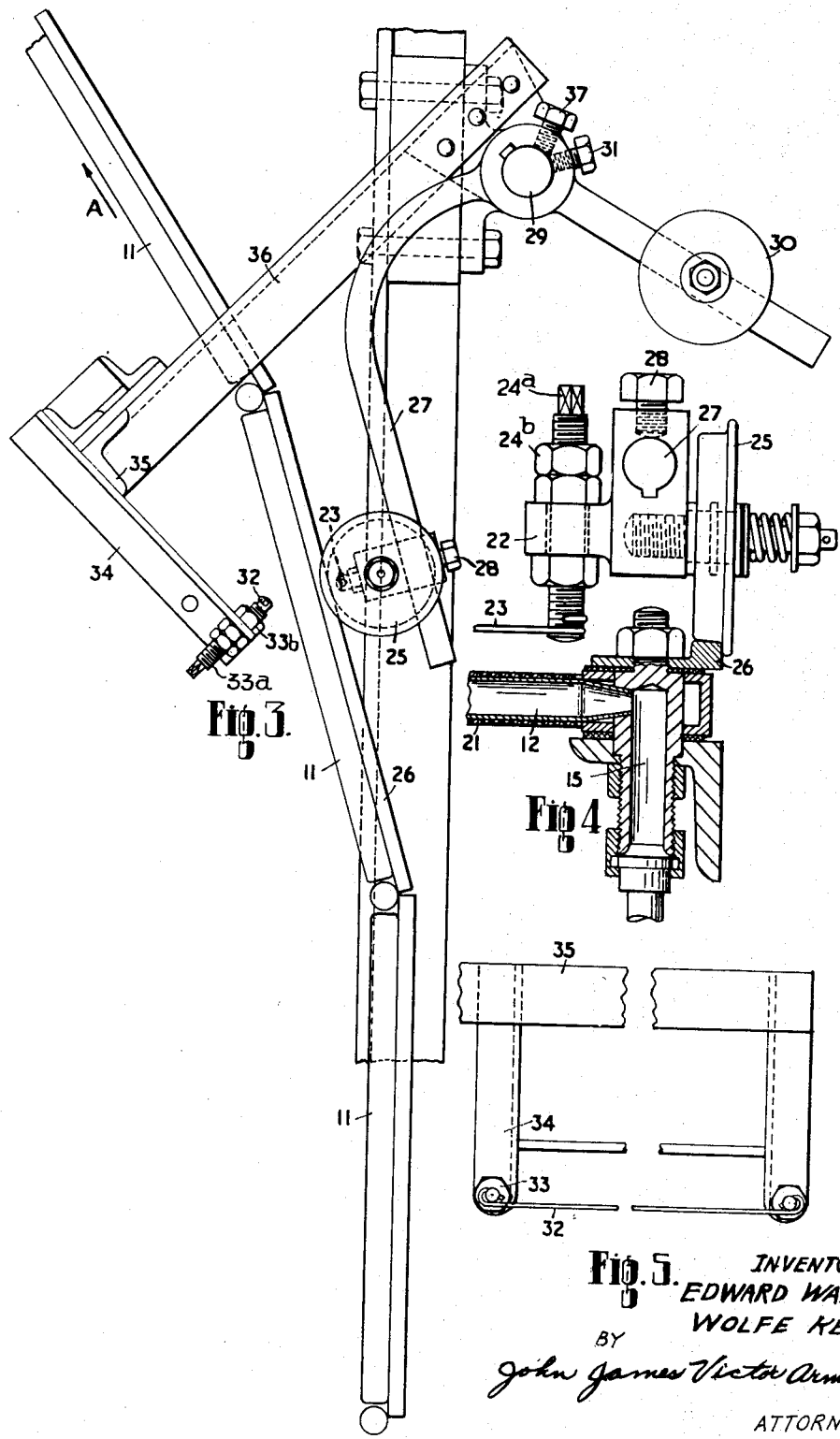

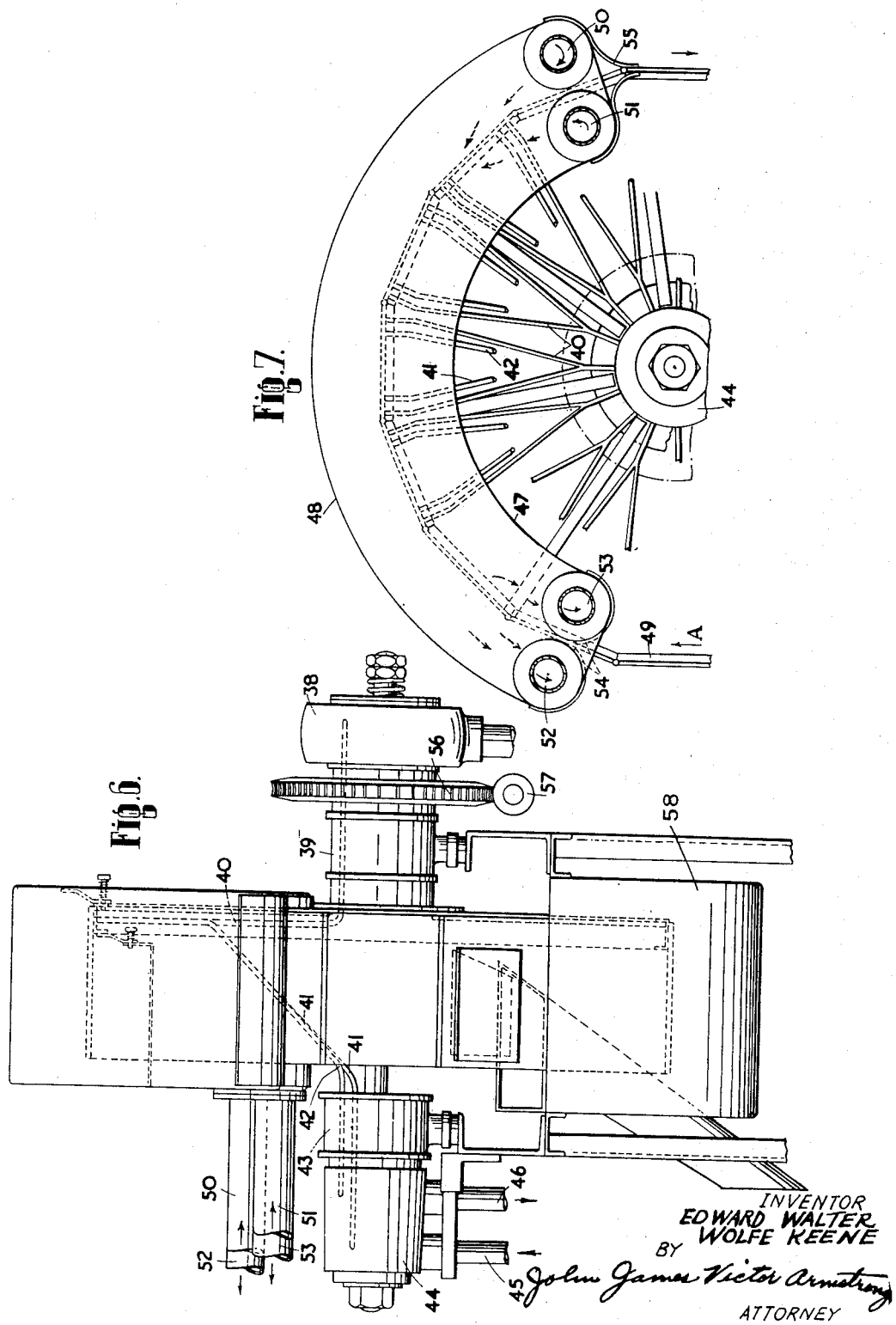

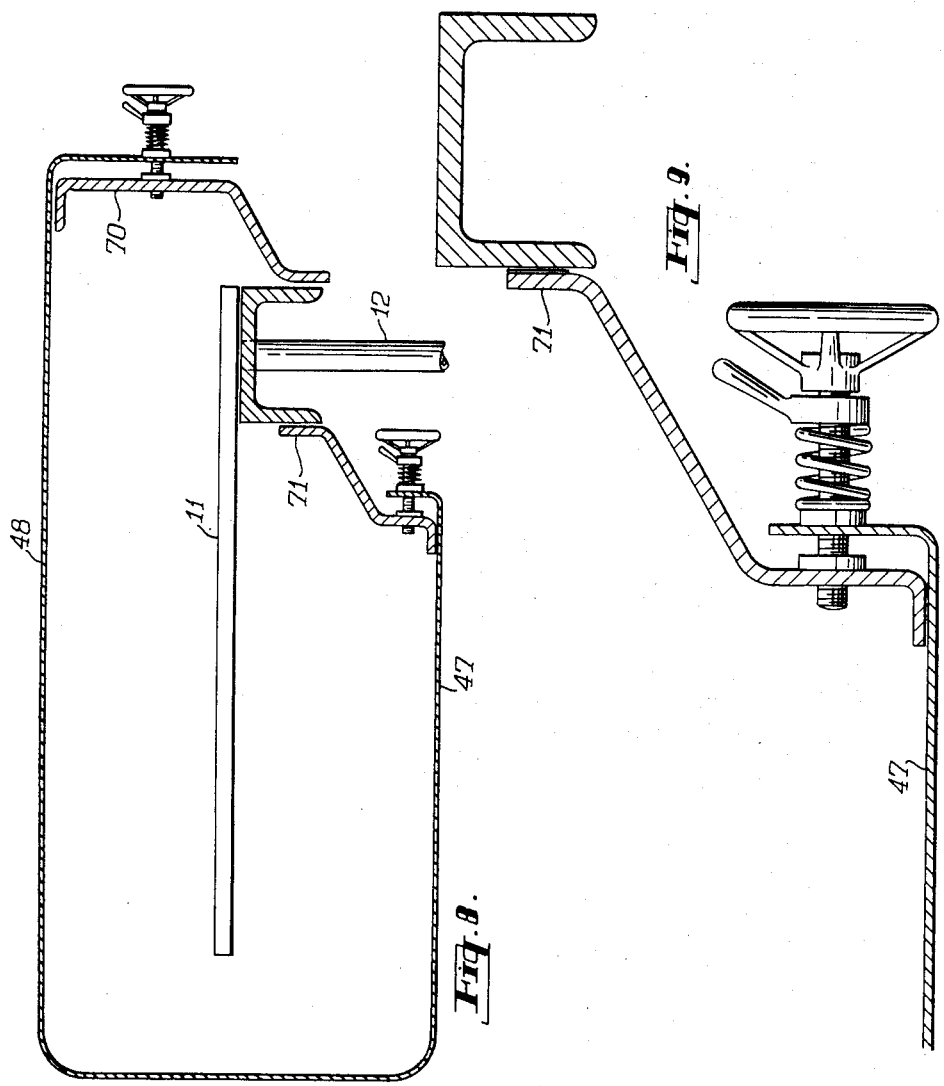

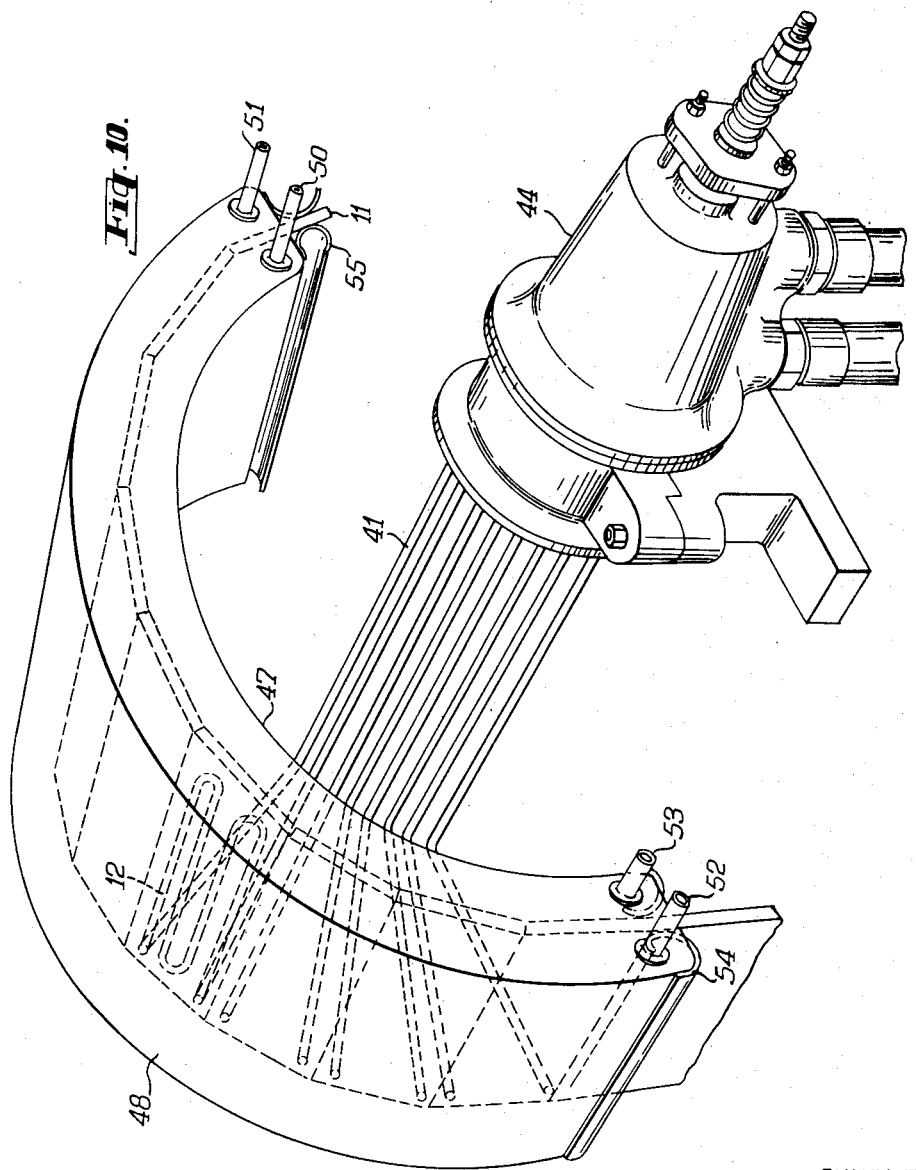

United States Patent Office 2,717,083
Patented Sept. 6, 1955

2,717,083

FILTRATION APPARATUS

Edward Walter Wolfe Keene, Kingston-upon-Hull, England

Application February 4, 1952, Serial No. 269,768

4 Claims. (Cl. 210—199)

This invention concerns suction filtration apparatus having filtering elements of flat leaf or disc form or of generally cylindrical drum form. Such disc or drum may, of course, comprise a plurality of individual leaves. The invention is concerned with filtration apparatus having either displaceable, e. g. rotary filtering elements, or fixed elements. It is especially concerned with filtration apparatus in which filtering elements have two effective surfaces, such as the apparatus disclosed and claimed in the specification of my prior British Patent No. 519,689.

According to this invention, a heat exchange means is disposed at or near the surface of a filtering element of the apparatus; said heat exchange means is preferably formed integrally with the filtering element and may be in the form of a grid or other hollow frame through which heating or cooling medium may be passed or which may be adapted to be heated by electrical resistance elements contained therein or associated therewith. In the case of dual surface filtering elements the heat exchange means is located conveniently between the two filtering surfaces.

The invention will be described further as applied to a vacuum filtration apparatus of the dual surface rotary drum type having its drum composed of a plurality of individual filter leaves, by way of example, with reference to the accompanying drawings, in which:

Fig. 1 is a sectional plan view showing a rectangular filter leaf, the upper filter cloth being removed to reveal the tube or grid temperature control channel;

Fig. 2 is a part end sectional view of the assembled filter leaf;

Fig. 3 is a view of a portion of the open end of the drum, showing inner and outer surface thickness regulators in position;

Fig. 4 is a view, in the plane of the filter leaf, showing the mounting of the front drum surface thickness regulator and the connection of the heating circuit to the filter tube grid;

Fig. 5 is a detail of the inner surface cake thickness regulator;

Fig. 6 is an end view of the filter, certain parts being not shown for the sake of clarity;

Fig. 7 is a corresponding side view;

Fig. 8 is a detail end sectional elevation through the drying chamber;

Fig. 9 is a corresponding sectional plan view; and

Fig. 10 is a perspective view of the drying chamber formed of the two shields and a rotary filter leaf assembly.

A filter leaf is fitted with a heat exchange grid 12 (Fig. 1) and is held in place by fish plates 13 welded to the grid, said fish plates also being welded to the ends of bolts 14 which are held in place by the side framework 11a of the filter leaf 11. Inlet 12a and outlet 12b for the tube, forming the grid 12, are fitted with hollow studs 15 (Fig. 4). Suction is applied through Y-shaped radial tubes 40 led from a central trunnion shaft 39, and connected to an automatic suction valve head 38. The heating medium is supplied and withdrawn through radial tubes 41 and 42 respectively, fitted to the opposite central trunnion shaft 43. The tubes 41 and 42 are connected to an automatic distributing valve head 44, to which a supply pipe 45 and a withdrawal pipe 46 are connected. The filter formed of a plurality of leaves connected in sequence to form an endless chain, is rotated by means of worm 57 engaging with pinion 56, so that the leaves in sequence are immersed in the material to be filtered in the vat 60, and then subsequently the filter cake built up on the porous covering of the leaves is removed when this is beyond a predetermined thickness by a scraper 32 mounted in the heating chamber 48. Filtrate outlets are provided at 16. Additional rigidity is provided by wire bending 17 round the leaf at each end, and loss of vacuum prevented by packing adequately round the joint 18.

A metal sheet 19, which may be perforated, is welded to the surface of the outer tubes 12 at the points of contact all along its length, and the outer ends of said strip turned in under the two short wire rods 20 as shown in Fig. 2, the whole then forming a support for the edges of the filter cloth 21, which is also turned in under the rods 20. The slight flexibility of metal strip 19 is enough to provide a tension grip for the filter cloth edges in this manner.

In Fig. 3 the outer and inner surface thickness regulators are shown in position. The front thickness regulator 22 is constituted by a wire or bar 23 carried on screw 24a adjustable by means of lock nut 24b. The framework of the front thickness regulator carries flanged wheels 25, guided by rails mounted at either end of the filter leaf. These details are further illustrated in Fig. 4.

Rod 27 is pivoted about a fixed point 29 and one arm carries the outer surface thickness regulator mechanism while the other arm carries a counterbalance weight 30. The position of rod 27 may be varied by the use of clamping screw 31 in conjunction with weight 30 and the position of the carriage 22 on this lever is fixed by clamping screw 28.

The inner thickness regulator 32 is carried by screws 33a adjustable by lock nuts 33b which are attached to short metal arms 34 fixed to an arm 35 of an L-shaped bar. The other arm 36 of said L-shaped bar is mounted at its free end on the pivot 29 as shown, and the clamping screw 37 enables the position of this inner surface regulator to be varied at will. It will be noted that whereas the outer surface thickness regulator 23 is supported at its extreme ends, the inner surface thickness regulator 32 is only supported at the open end of the drum.

In operation, the rotation of the filter drum in the direction of the arrow A causes each filter leaf in turn to move past the wheels 25 which are in contact with the rails 26.

The contact between the wheels 25 and the rails 26 gives rise to a simultaneous oscillatory or pendulum-like motion of the inner and outer thickness regulators; the two regulators moving in unison about pivot 29. This motion ensures that the filter cake is built up so that its surface is parallel to that of the filter leaf.

To further dry the cake, two shields 47, 48 in the shape of circular segments are provided, enclosing the upper portion of the drum (the portion which does not dip into the liquid to be filtered).

Pipes 50, 51, 52, 53 for the supply and withdrawal of conditioned (i. e. hot or cold) air are provided at the ends of the shield. Sealing flaps 54, 55 are provided at the ends of the shield. Sealing flaps 54, 55 are provided at the points of ingoing and outcoming of the drum 49.

The filter leaves 11, the interiors of which are connected to the suction pipes 12, pass through the heating chamber formed by the two shield segments 47, 48 forming the heating drum, which is provided with adjustable valances 70, 71, respectively. By this means it will be possible to ensure efficiency in operation, in that heat will be conserved within the drying chambers 47, 48.

I claim:

1. A rotary suction filter including in combination a plurality of leaves each formed of a frame and a porous enclosing covering, means to displace said leaves in sequence in a closed path, a heating chamber enclosing a part only of said path, scraper means disposed at a predetermined distance from the path swept out by the surfaces of the said leaves as they are displaced through said chamber, means to maintain the interior of said leaves at a lower pressure than the atmosphere, heating means within each filter leaf, and means for selectively rendering said heating means operative.

2. A rotary suction filter including in combination a plurality of filter leaves each formed of a frame enclosed by a porous covering, means to displace said leaves in sequence in a closed path through a mass of material to be filtered and subsequently to a heating chamber, heating means within each filter leaf, means for selectively rendering said heating means operative, means to remove material beyond a predetermined thickness accumulated upon the porous surface of said leaves in said chamber, and means to maintain the interior of said leaves at a lower pressure than the atmosphere.

3. A rotary suction filter including in combination a plurality of leaves each formed of a frame, a porous enclosing covering, heating means within each frame, means for selectively rendering said respective heating means operative, means to displace said leaves in sequence in a closed path, a heating chamber enclosing a part only of said path, scraper means disposed at a predetermined distance from the path swept out by the surfaces of the said leaves as they are displaced through said chamber, and means to maintain the interior of said leaves at a lower pressure than the atmosphere.

4. A rotary suction filter comprising a plurality of hollow filter leaves disposed at the outer periphery of a rotatable drum, each of said filter leaves comprising a frame enclosed by a porous covering, means to displace said leaves in sequence through a mass of material to be filtered, a pipe grid work disposed within each of said filter leaves, fluid inlet and outlet pipes connected to the pipe grid work of each filter leaf, a suction inlet to each of said filter leaves, pipe means connected to the suction inlet of each filter leaf, a first stationary distributing valve connected to a heat supply means, said fluid inlet and outlet pipes of said grid work extending into communication with said first distributing valve, said fluid inlet and outlet pipes being rotatable with respect to said first distributing valve whereby the pipe grid works of the respective leaves are connected to said heat supply means in accordance with the rotation of said suction filter, a second stationary distributing valve connected to a suction supply means, said pipe means connected to said filter leaves extending into communication with said second distributing valve whereby suction is applied to said filter leaves in accordance with the rotation of said suction filter.

References Cited in the file of this patent

UNITED STATES PATENTS

| | | |
|---|---|---|
| 586,593 | Chamberlain | July 20, 1897 |
| 2,044,214 | Jones | June 16, 1936 |

FOREIGN PATENTS

| | | |
|---|---|---|
| 519,689 | Great Britain | of 1940 |
| 637,790 | Great Britain | of 1946 |